3,476,434
VEHICLE WITH SHOCK ABSORBING MOUNTING
Robert D. Coyle, 321 Croft Road,
North Wales, Pa. 19454
Filed Sept. 12, 1967, Ser. No. 667,209
Int. Cl. B62d 23/00; B60n 1/02
U.S. Cl. 296—35   6 Claims

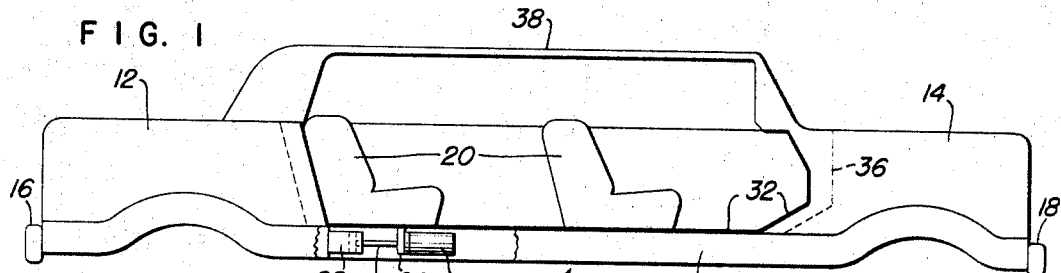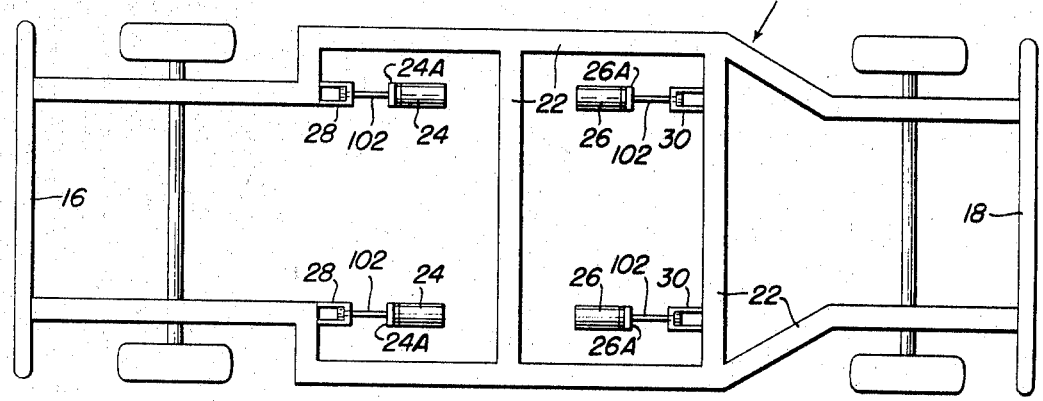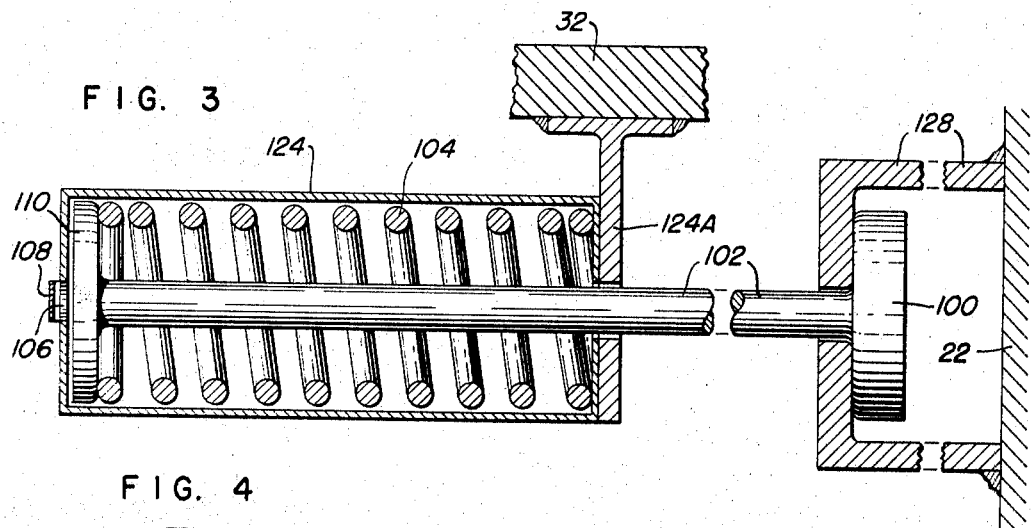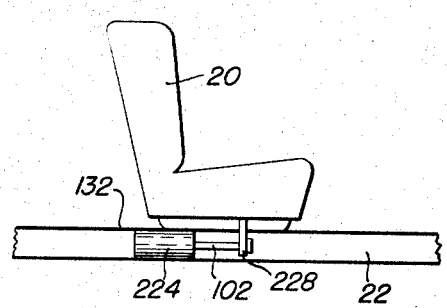

ABSTRACT OF THE DISCLOSURE

An automotive vehicle having a shock mounted passenger carrying area is provided. The shock mounted compartment or seat is free to move horizontally whereby deceleration forces on the passengers are dissipated more slowly.

It has been well recognized in many studies of fatalities and injuries caused by automobile collisions that the so called "second collision" causes a great problem. That is, a large number of injuries and deaths result from the inertia of the passenger in the car tending to keep the passenger in motion even though the automobile may have been substantially completely stopped due to a collision with another object. This so called second collision can be disastrous when it is considered that the automobile may be moving at a high rate of speed and forced to decelerate in the space of a few inches. Several methods of attempting to absorb the shock of the collision have been proposed. However, none of these proposed inventions has been satisfactory.

Consequently, the subject invention is proposed. In this invention, the passenger carrying portion of the automobile can be movably mounted within the chassis of the automobile. The passenger carrying compartment may be in the nature of a capsule-type compartment or it may be merely a platform or brace for carrying the seating arrangements. In either embodiment, the passenger carrying compartment is mounted by a unique arrangement of springs (and optional pneumatic controls) or other resilient means such that although the chassis and shell of the automobile have been forced to stop due to a collision, the independently mounted passenger carrying compartment is free to move against a spring loaded control such that the inertial forces are absorbed during the travel of the passenger carrying compartment. Thus, the shock of the collision is partially absorbed in the vehicle body and frame and partially absorbed in the compartment mounting apparatus. Therefore, relative to the vehicle per se, the passenger has the inertial forces and deceleration forces absorbed in a substantially greater time. Thus, the rate at which the deceleration forces are dissipated is much reduced.

Thus, it is an object of this invention to provide a vehicle having an independently supported passenger carrying compartment.

It is another object of this invention to provide a vehicle having a passenger carrying compartment which assists in the dissipation of shock forces caused during a collision.

It is another object of this invention to provide an automotive vehicle which is safer for the occupants thereof.

These and other objects and advantages of this invention will become more readily apparent when the following description is read in conjunction with the attached drawings, in which:

FIGURE 1 is a diagrammatic showing of an automotive vehicle, partially in section, which shows the passenger carrying compartment and the shock absorbing system;

FIGURE 2 is a diagrammatic bottom view of the vehicle shown in FIGURE 1 and which shows the shock absorbing system;

FIGURE 3 is a diagrammatic showing of the shock absorbing system, partially in section; and FIGURE 4 is a partial diagrammatic showing of a second embodiment of the invention.

Referring now to FIGURE 1, a vehicle, designated generally as 10 is shown, partially in section. The vehicle, as shown, is indicative of a standard passenger automobile and is not limited to any special type of automobile or configuration. The body portion of automobile 10 comprises the rear portion 12 which is usually a trunk area and a hood or front portion 14 wherein the motor is frequently located. The rear and front bumpers 16 and 18 are diagrammatically shown. A chassis 22 is depicted as running substantially the entire length of the vehicle. The configuration of chassis 22 is not limitative of the invention but is, rather, illustrative only.

A passenger compartment which is indicated by the heavy outline 32 is located within the body of the vehicle and is mounted, by suitable means, in a movable relationship to chassis 22. Front and rear seats 20 are shown affixed to the compartment 32. A shock absorbing system, defined and described in more detail hereinafter, comprises spring loaded elements contained within compartments 24 and 26, respectively. The spring loaded elements are connected via suitable rods to caps or flanged ends which engage with the abutments 28 and 30, respectively. The dashed lines 34 and 36 indicate the rear and front external walls such as the trunk wall and the fire wall, respectively.

As noted, compartment 32 is movably mounted with respect to chassis 22. For example, chassis 22 may be substantially hollow, or have a groove therein or the like into which an extended ledge or ear-like portion which protrudes from the base of compartment 32 is projected. Rollers or other suitable bearings may be mounted relative to the chassis to eliminate wear. This arrangement permits compartment 32 to slidably move relative to chassis 22 in a confined and constrained manner. The constraint generally prohibits vertical movement of the compartment relative to the chassis. It is understood, of course, that additional constraints may be incorporated such that the relative movement between vehicle 10 and compartment 32, per se, is limited.

In this invention, the passenger compartment 32, as noted, is free to move relative to the chassis 22 of the vehicle. More particularly, the compartment 32 is free to move toward the front and rear of the vehicle. The respective movements of the compartment are controlled by the shock absorbing system noted. For example, in the event of a front end collision relative to the configuration shown in FIGURE 1, the bumper 18 would first strike the object collided with. Bumper 18 would tend to collapse and absorb some shock. Similarly, the hood 14 or fender portion of the body would similarly tend to collapse. In a standard automobile, this limited collapsing and shock absorption would be the extent of the energy dissipating stage. The passengers would immediately upon the termination of this small collapsing, be propelled forwardly within the automobile due to inertia.

However, in the instant invention, after the time period during which the automobile body collapses whereby a certain amount of the deceleration force has been dissipated, the compartment 32 would be free to move and would continue to move due to the inertial force. However, in this case the passenger is safely maintained within the compartment. More particularly, the spring loaded rod in compartment 24 would become effective. That is, the cap on this rod is brought into engagement with abutment member 28. The rod, being fabricated of rigid, non-extensible material will engage one end of the coil spring in compartment 24. The other end of the spring is in engagement with the end of the compartment. The spring will be compressed by the relative action of the rod. Thus, the forward motion of compartment 32 will be governed and controlled by the energy absorbing characteristics of the spring in compartment 24. By properly designing the coil spring, large amounts of energy may be dissipated in a space of several inches. This energy dissipating time period is in addition to the energy absorbing time period during which the front end of the vehicle is collapsing.

A similar operation occurs relative to a rear end collision wherein the standard collapsing of bumper 16 and trunk lid 12 occurs. Here, in addition, the coil spring within compartment 26 absorbs the shock of the impact to the chassis while the passengers remain substantially stationary relative to movable compartment 32.

The space between the solid outline of compartment 32 and the dashed lines 34 and 36 indicates the shock absorbing areas. That is, the amount of space between these planes defines the available motion of the passenger compartment. Of course, the greater this distance, the greater the force dissipating time and, thus, the lower the rate of dissipation of the inertial force. In existing vehicles, about 8 inches are available for this purpose.

Referring now to FIGURE 2, components which are similar to those shown in FIGURE 1 bear similar reference numerals. Thus, the rear and front bumpers 16 and 18 are shown. The chassis 22 is shown connected between the bumpers. Other portions are omitted for clarity. It is shown that the abutments 28 are connected to the chassis 22. The specific method of forming the connection and abutment is not limited to the illustrated configuration. Similarly, the abutments 30 are shown in a configuration which is illustrative only. The coil containing compartments 24 and 26, respectively, are shown connected to the bottom of the passenger carrying compartment 32. Abutments 24A and 26A are also connected to the bottom of compartment 32 to provide mounting and abutment for the respective coil compartments.

Referring now to FIGURE 3, there is shown, for example, coil compartment 124. This compartment contains a large coil spring 104 which is adapted for compressional forces. A rod comprising shaft 102 and flange ends 100 and 110 is provided.

The flanged end 110 of the rod is located within the coil compartment 124 and has a diameter which is smaller than spring 104. The coil spring 104 surrounds the shaft 102. The flanged end 100 of the rod is mounted within the chassis abutment 102. The compartment abutment 124A is rigidly mounted at compartment 32. Thus, coil compartment 124 is restrained from moving. As the compartment 32 tends to move relative to chassis 22 (not shown) as a result of a collision, abutment 124A and compartment 124 also tend to move. However, shaft 102 remains fixed due to the abutting end 100. The flanged end 110 of the rod engages coil 104 and tends to compress same against the internal surface of compartment 124. Thus, the inertial force of compartment 32 is transferred to coil 104 and dissipated thereby.

A port 106 is shown and may optionally be included in one end of compartment 124. A flapper valve or the like 108 may be associated with the port. This port may be used to allow the escape of compressed air when the spring 104 tends to return the shaft 102 to its proper position after compression. In the opposite operation, the flapper valve 108 tends to close port 106 whereby a limited type of vacuum or compressed air condition (depending upon the reference point) is created relative to flanged end 110 of shaft 102.

Referring now to FIGURE 4, there is shown a diagrammatical representation of a second embodiment of the invention. In this embodiment, the compartment 32 is replaced by planar portion 132 to which the seats 20 are attached. In the embodiment shown in FIGURE 4, the spring or coil compartment 224 (only one is shown) is attached to a central member of the chassis and to the platform type arrangement to which seats 20 are attached. It is to be understood of course, that both front and rear balanced spring systems can be included. In this embodiment, the overall compartmentized vehicle is altered wherein only the seats 20 and seat carrying platform 132 are free to move relative to the vehicle represented by reference numeral 10. This embodiment reduces the size of the fuselage unit or compartment but permits the same shock absorbing system to operate.

Preferred embodiments of the invention have been described herein. The embodiment shown and described are meant to be illustrative only of the subject invention; these embodiments are not meant to be limitative. It is understood that those skilled in the art may contemplate modifications and changes to the embodiments shown. However, if these modifications and changes are within the inventive concepts described, they are meant to be included within the scope of this description.

Having thus described a preferred embodiment, what is claimed is:

1. A improved vehicle including, chassis section, passenger section, resilient means coupling said passenger section to said chassis section to permit substantially horizontal relative motion therebetween to a limited extent, said resilient means including compartment means for containing selectively yieldable means, and piston means extending into said compartment means for selectively applying force to said selectively yieldable means, said compartment means being rigidly affixed to one of said chassis section and said passenger section, and said piston means loosely connected to the other said chassis section and said passenger section to permit constrained movement of said piston means.

2. The improved vehicle recited in claim 1 wherein, said yieldable means comprises coil spring means, said compartment means and said piston means separately connected to one of said chassis section and said passenger sections such that relative motion between said section causes said pressure to be applied to said coil spring means.

3. The improved vehicle recited in claim 1 wherein, said passenger section comprises a compartment containing all of the passenger seats, and support means to which all of said seats are fastened, said resilient means being connected to said support means.

4. The improved vehicle recited in claim 1 wherein said passenger section comprises at least one seat, said resilient means being separately connected to each said seat.

5. The improved vehicle recited in claim 1 wherein said resilient means includes pneumatic control means, said pneumatic control means selectively affecting the resiliency of said resilient means.

6. The improved vehicle recited in claim 1 including at least two of said resilient means mounted for operation in opposite directions whereby said passenger section may move in either direction relative to said chassis section, each of said compartment means being affixed to said passenger section, and each of said piston means being affixed to said chassis section.

References Cited
UNITED STATES PATENTS

| | | | |
|---|---|---|---|
| 2,959,446 | 11/1960 | Thompson. | |
| 3,129,017 | 4/1964 | Graham | 296—65 X |
| 3,162,479 | 12/1964 | Hewitt | 296—35 |
| 3,367,709 | 2/1968 | Sung | 296—35 |

PHILIP GOODMAN, Primary Examiner

J. A. PEKAR, Assistant Examiner

U.S. Cl. X.R.

296—65